United States Patent Office 3,537,797
Patented Nov. 3, 1970

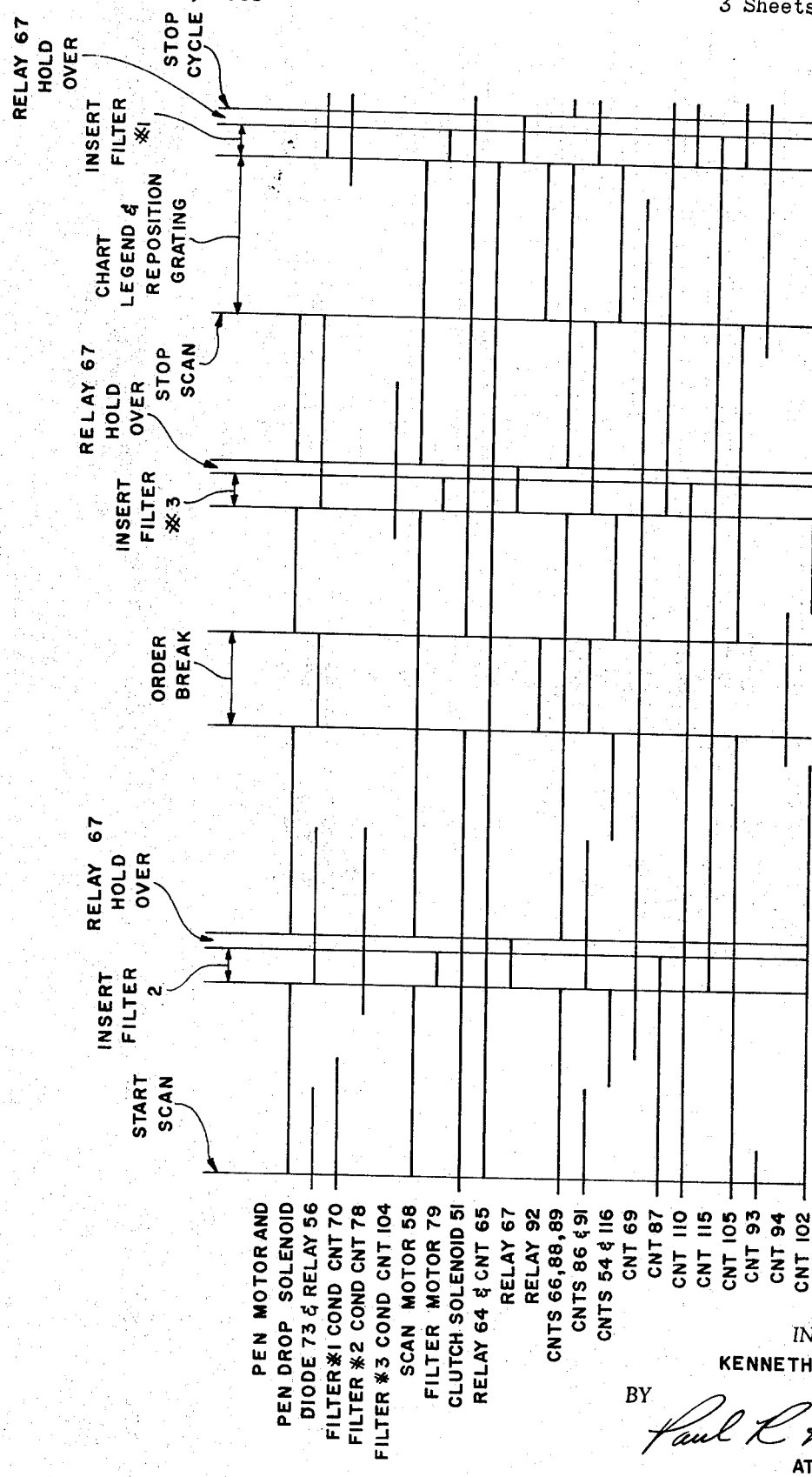

3,537,797
CONTROL CIRCUIT FOR AUTOMATIC RADIANT ENERGY ANALYZERS
Kenneth V. Matthews, Garden Grove, Calif., assignor to Beckman Instruments, Inc., a corporation of California
Filed Mar. 1, 1968, Ser. No. 709,580
Int. Cl. G01j 3/42
U.S. Cl. 356—93                    5 Claims

ABSTRACT OF THE DISCLOSURE

There is disclosed a control system for radiant energy analyzers in which all critical functions are initiated by optical means. A control circuit is provided in which various circuits are conditioned by cam operated mechanical switches, the operation of the control circuit being initiated by the optical means. In this manner, only the tolerances and alignment of the optical means are critical.

---

This invention relates generally to radiant energy analyzers and more particularly to a control system therefor wherein all critical functions are initiated by optical means.

In radiant energy analyzers, and particularly in analyzers utilized in the infrared region of the energy spectrum, it has generally been found necessary to utilize optical filters in connection with dispersing elements such as gratings to eliminate unwanted orders which would otherwise pass through the system. In many instances, and particularly in those radiant energy analyzers capable of scanning over a wide range of wavelengths, it is also necessary to change from one order of a grating to another or from one grating to another. Further, it is often desirable to maintain the recorder chart drive in synchronism with the wavelength drive motor so that the chart indicia is at all times in registry with the actual wavelength to be scanned.

To provide a continuous uninterrupted record of the spectrum over the entire wavelength range of the instrument it has been the usual practice to provide one or more control cams utilized to actuate mechanical microswitches. One such system for the control of a double monochromator spectrophotometer utilizing a combination of a prism and a grating is illustrated in U.S. Pat. No. 2,948,185. While such systems are generally satisfactory it is difficult in many instances to precisely align and maintain the alignment of the cams and to position the micro-switches such that the various functions take place at the precise wavelength desired.

The present invention avoids many of these problems and provides for precise control through the combination of a plurality of conditioning contacts which may be micro-switches cooperating with one or more cams on the wavelength drive shaft to condition various circuits for operation upon the initiation of a condition change in the instrument by optical means. The positioning and alignment of the mechanical micro-switches is therefore not particularly critical and all critical operations are under the control of an optical device. In the preferred embodiment disclosed herein the various functions are initiated by a cam located on the wavelength drive shaft utilized to control the radiation passing from a source to a radiation sensitive element, such, for example, as photodiode. By this means only the tolerances and alignment of this cam with respect to the wavelength drive cam are critical.

Figure 1:
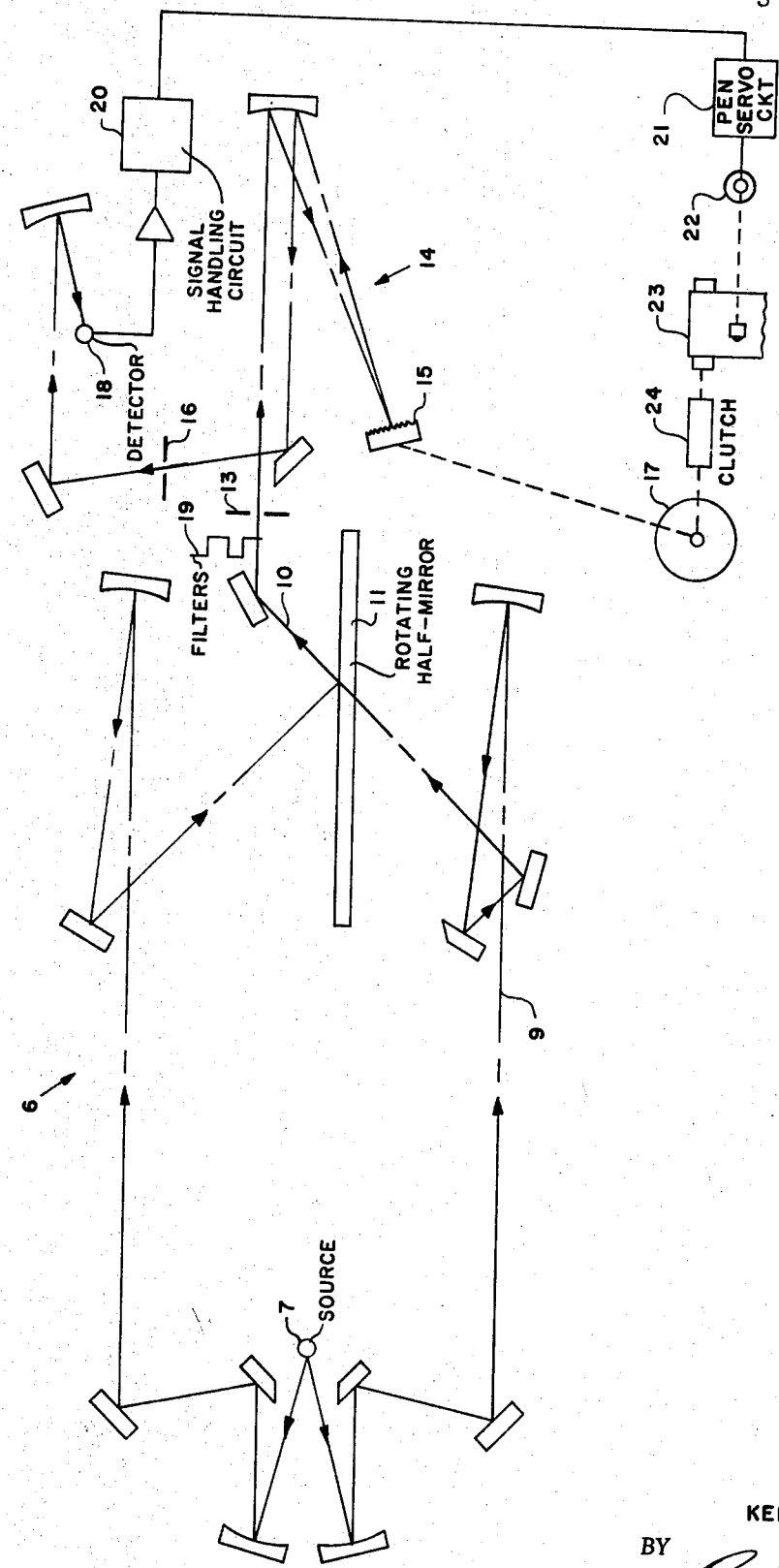
Figure 2:
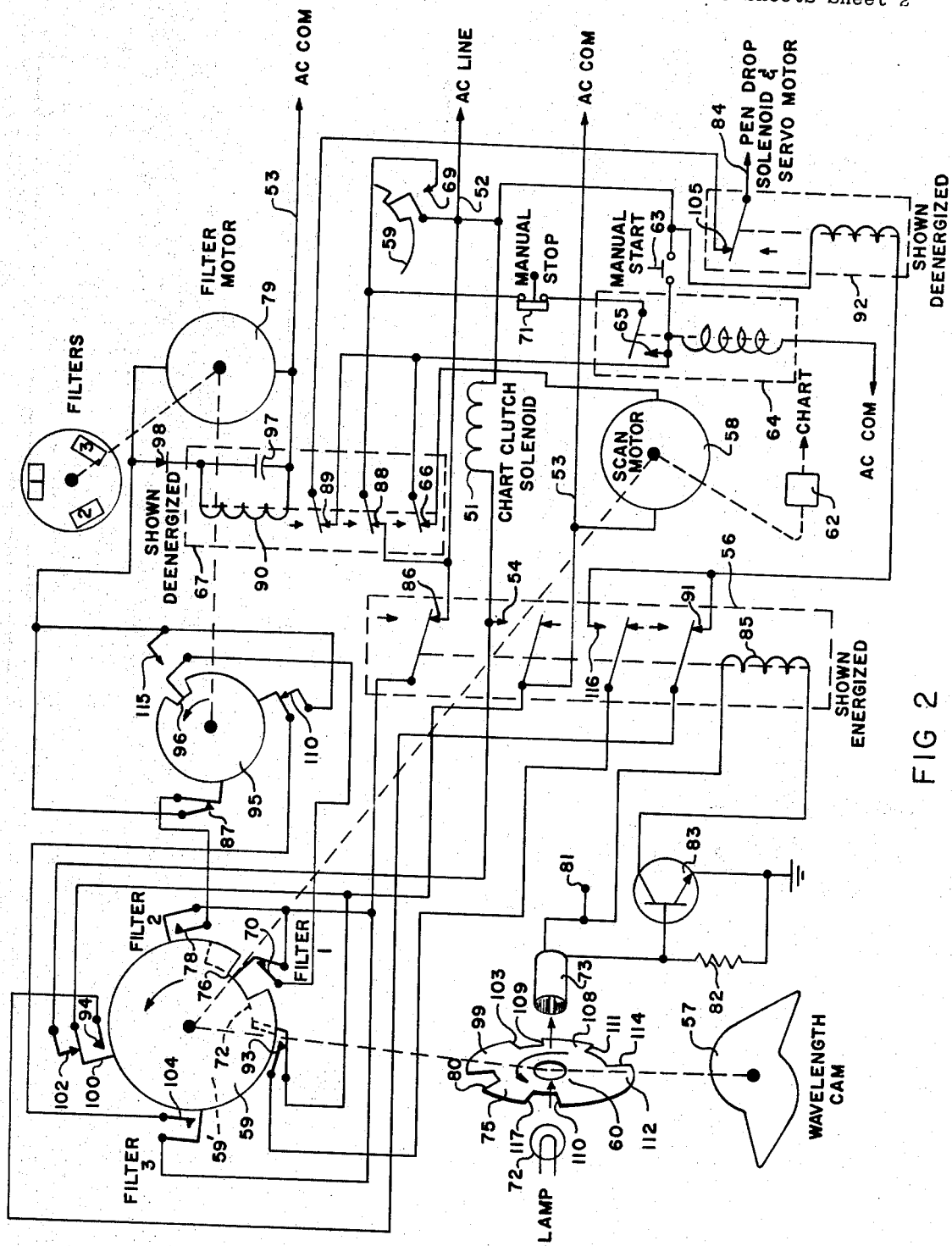

Various features and many of the attendant advantages of this invention will become more readily appreciated as the same becomes better understood by reference to the following detailed description of one preferred embodiment of the present invention when considered in connection with the accompanying drawings and in which:

FIG. 1 illustrates a radiant energy analyzer embodying the invention;
FIG. 2 is a schematic diagram of the control system for the radiant energy analyzer of FIG. 1; and
FIG. 3 illustrates the timing sequences of the various operations of the preferred embodiment of FIG. 2.

Referring now to FIG. 1 there is illustrated in block form a radiant energy analyzer comprising generally a photometer section 6 in which radiation from sources 7 is directed along reference and sample beam paths 8 and 9 respectively before being recombined along a common beam path 10 by a rotating half-mirror 11. Radiation time sharing the common path 10 is directed through the entrance slit 13 of monochromator 14 for dispersion by any suitable element such, for example, as grating 15. Dispersed radiation from the grating 15 is scanned past the monochromator exit slit 16 by a wavelength drive motor 17, usually through suitable cams, not shown, to provide a radiation output at the exit slit of discrete wavelength. Radiation from the exit slit of the monochromator is direced to a detector 18 which produces an electrical signal output that is a function of the intensity of the instantaneous radiation incident thereon. Associated with the entrance slit of monochromator 14 are a plurality of order sorting filters 19 which are automatically positioned in the radiation path at various points in the spectrum to eliminate radiation from unwanted orders as is well known to those skilled in the art.

The output of the detector, generally after amplification, is directed to circuitry, illustrated in FIG. 1 in block form at 20, for the purpose of producing an output signal which is indicative of the function to be recorded, usually sample transmittance. A detailed description of the circuitry is not deemed necessary to an understanding of this invention but it is to be understood that the radiant energy analyzer may be either of the ratio recording or optical null type both of which ultimately produce an electrical signal which is a function of sample transmittance. This signal is applied at the input of the pen servo circuit utilized to drive the pen motor 22 of a recorder. The chart paper 23 is driven in synchronism with the dispersing element. Although the chart drive may take many forms it is illustrated in the instant embodiment as being driven by the wavelength scan motor 17 through electromagnetic clutch 24.

In order to provide a continuous, uninterrupted record of sample transmittance over a wide range of wavelengths it is generally necessary to interrupt the scanning cycle while order sorting filters are inserted into the radiation beam path or when the grating is repositioned to select another order or to change gratings. Depending upon the function taking place it may be desirable to disable the pen servo circuit so that spurious signals are not recorded and to lift the pen from the recorder chart. Further, depending upon the function taking place, it may be desirable to disconnect the chart drive from the grating. It is highly desirable to perform these functions at precise points in the spectrum to preserve the integrity of the recorded spectrum and to minimize errors resulting from the various changes. For example, it is deirable to change filters at a point in the spectrum where their transmission characteristics are substantially identical so that the system is not affected by any difference in attenuation of these filters. Thus the points at which filters are changed in the spectrum should be precisely controlled. In order to reduce spurious signals to the pen servo circuit during the changing of these filters, it is desirable to disable the pen servo system circuit. Since the scan is stopped during filter change it is not necessary to disconnect the chart from the wavelength drive system during this function. When, however, it is desired to change from one grating order to another or from one grating to another it is necessary to disconnect the chart from the grating drive system. Again, in order to prevent any discontinuity in the recorded spectrum it is necessary to stop the scan, or the recording thereof, at one wavelength in one order and to reinitiate the scan or the recording thereof at exactly that same wavelength in the next order.

As has been hereinbefore pointed out, it is extremely difficult and expensive to precisely align, and maintain the alignment of, various mechanical micro-switches to perform these functions. Many of these problems are overcome by utilizing control circuitry incorporating the features of this invention, one embodiment of which will be described in detail hereafter in connection with FIGS. 2 and 3. In the embodiment constructed after the teachings of this invention various control circuits are conditioned by mechanical switches operated from one or more conditioning or control cams coupled to the wavelength drive shaft but all critical functions are initiated through optical means.

Reference is now made to FIGS. 2 and 3 which illustrate respectively a preferred embodiment of the conditioning and function control circuitry of the spectrophotometer of FIG. 1 and a graph of the condition of the various relay and switch contacts throughout an entire cycle of operation.

In FIG. 3 a solid line indicates, when utilized in connection with a switch or relay contact, that the contacts are closed; when utilized in connection with a motor, solenoid or relay that the element is energized; and, when utilized in connection with the photodiode indicates that it is exposed to radiant energy and thus has a low impedance. As used in connection with the various contacts and relays the terms "normally closed" or "normally open" refer to the condition of the designated contact with the associated relay unenergized.

FIG. 2 illustrates the condition of the system prior to the commencement of a scan and as indicated in FIG. 3 photodiode 73, relay 56 and chart clutch solenoid 51 are energized, relays 92 and 67 are de-energized, and the condition of the various contacts is indicated in FIGS. 2 and 3. The scan motor is not energized because of open contacts 63 and 65. Line 84 connects the AC line to the pen servo motor and a pen drop solenoid which, when energized, pulls the pen down on to the chart paper against the bias of a spring. By removing the AC power from the pen servo motor the motor is disabled and the pen servo circuit ineffective. In the system condition illustrated in FIG. 2, the pen servo motor is disabled and the pen lifted from the chart because of open contacts 63 and 65 even though contacts 89 and 105 in series with line 84 are closed. It is to be understood that the AC line 52, lamp 72 and the power supply for the photodiode control circuitry are all ultimately controlled by the on-off switch of the instrument. Order sorting filter No. 1 is already in the optical path.

The wavelength cam 57 is driven by scan drive motor 58 through any suitable gearing, not shown, to provide for the selection of varying scan speeds. Condition control cam 59 and a function control cam 60 are also driven in synchronism with wavelength cam 57. A second condition control cam 59' is located directly below cam 59 having one indentation 72 shown in phantom on control cam 59. The only switch associated with cam 59' has the conditioning contact 93. The indentation 72 is such that contact 93 is closed during repositioning of the grating at the end of the scan and "brackets" the legend area of the chart as hereinafter described. Scan drive motor 58 is also utilized to drive a chart through an electrode magnetic clutch 62 which is controlled by chart clutch solenoid 51. When solenoid 51 is energized the clutch is closed and the chart coupled to scan motor 58. In the condition illustrated in the drawing the wavelength scan drive chain is stopped approximately 1° ahead of the initial scan wavelength.

Referring now to the function control disc 60, before the manual start button is depressed, radiation from lamp 72 passes the indentation between blades 112 and 75 and the narrow slit in photodiode 73 to energize the photodiode. Under these conditions the impedance of the photodiode is small and current flows from terminal 81 through resistor 82 and transistor 83 is biased "on," thereby providing a current path from terminal 81 through coil 85 of relay 56 which is therefore energized. In the energized condition as shown in FIG. 2 contacts 86 and 91 are closed and contacts 54 and 116 open. Closed contact 86 has no effect upon the circuit because filters No. 2 and 3 condition control contacts 78 and 104 are open and, although filter No. 1 condition control contact 70 is closed, contact 115 associated with function control cam 95 is open. The recorder chart clutch is engaged since open contact 54 associated with relay 56 is paralleled by closed contact 102 associated with armature 100 and condition control cam 59 connecting chart clutch solenoid 51 between AC line 52 and AC common line 53. Line 84 connects the AC line 52 to the pen servo motor and the pen drop solenoid and since contacts 65 and 63 are open the pen servo motor is disabled and the pen lifted from the chart.

To start the scan the operator momentarily depresses the manual start button 63 which connects holding relay 64 between AC line 52 and ground to close contact 65. Scan drive motor 58 is thus energized through contact 65 and normally closed contact 66 of relay 67. Upon closure of button 63 the AC line 52 is connected to line 84 and the pen solenoid energized and the pen servo motor enabled through closed contacts 89 and 105.

As soon as relay 64 picks up to close contact 65, the manual start button 63 may be released since contact 65 closes a parallel holding circuit for relay 64 through normally closed manual stop button 71 and normally closed contact 88. Thus the system immediately commences the wavelength scan. Shortly after the scan is begun contact 93 opens.

At any time after contact 93 opens and prior to the next function controlled by the circuit, edge 117 of blade 75 on function control disc 60 passes between lamp 72 and the slit of photodiode 73, blade 75 blocking the radiation. The increased impedance of photodiode 73 turns transistor 83 off and relay 56 drops out, opening contacts 86 and 91 and closing contacts 54 and 116. This operation has no effect on the system since contacts 78 and 104 in series with contact 86 are open as is contact 115 in series with closed contact 70; contact 94 in series with contact 91 is open; contact 102 in parallel with contact 54 is closed; and contact 93 in series with contact 116 is now open.

Contact 69 has been shown displaced from condition control disc 59 for simplicity. Contact 69 operates with filter No. 1 condition control contact 70, which will be more fully described hereinafter, and may be physically located above or below contact 70. After the scan has advanced a predetermined amount contact 69 closes and contact 70 opens with the advancement of indentation 76 on condition control cam 59. Upon closure of contact 69 a parallel circuit for holding relay 64 is established through this contact so that subsequent operations of relay 67 (and opening of contact 88) do not cause relay 64 to be dropped out until filter No. 1 is again selected at the end of the scan. Thus once contact 69 is closed, relay 64 remains energized throughout the entire scan cycle of the instrument unless the manual stop button 71 is opened.

The foregoing conditions are maintained until filter No. 2 is to be inserted into the optical path of the instrument. Prior to the wavelength at which the filter change occurs the notch 76 in condition control disc 59 reaches filter No. 2 condition contact 78. Contact 78 closes providing an enabling circuit for filter motor 79. When the appropriate wavelength is reached edge 80 of blade 75 clears the radiation path between lamp 72 and photodiode 73 to illuminate the photodiode. Illumination of the photodiode 73 decreases its impedance turning on transistor 83 and energizing relay 56.

With the energization of relay 56 several simultaneous events occur. Previously closed contact 54 opens but is not effective to disconnect clutch 62 from scan drive motor 58 because contact 102 in the parallel circuit is still closed. Contact 86 is closed to connect filter motor 79 and the coil 90 of relay 67 between AC line 52 and AC common line 53 through closed contacts 78 and 87. Energization of relay 67 opens contacts 66, 88 and 89, the opening of contact 66 stopping scan drive motor 58 and the opening of contact 89 de-energizing the pen servo motor and the pen drop solenoid to disable the pen and lift it from the chart.

Reverting now to relay 56 which has just been energized, contact 91 is also closed but is ineffective to energize relay 92 because contact 94 associated with conditioning control disc 59 is open. Likewise, closure of contact 116 does not energize relay 92 since contact 93 is open. The pen servo motor is disabled and the pen drop solenoid de-energized through the opening of contact 89 associated with the relay 67. Thus, when filter No. 2 is to be inserted, the photodiode operates to stop the scan motor 58, disable the pen servo motor, lift the pen and energize the filter change motor 79.

Filter motor 79 rotates to position filter No. 2 into the radiation beam path in the monochromator. A second function control disc 95 is also driven by filter motor 79 until notch 96 in disc 95 is driven to a position to open contact 87. When contact 87 is opened filter No. 2 is appropriately positioned and the filter motor circuit opened. Capacitor 97 connected across coil 90 of relay 67 prevents the de-energization of relay 67 for a sufficient period of time after opening of contact 87 to allow any transient conditions to die away. Diode 98 prevents the discharge of capacitor 97 through filter motor 79. At the start of the filter change sequence, contact 115 also closes to condition the filter No. 1 control circuitry, herein after more fully described.

After capacitor 97 has discharged through coil 86 to provide a hold-over time, relay 67 is de-energized and contacts 66, 88 and 89 are again closed. Closure of contact 66 restarts the scan drive motor 58 and closure of contact 89 re-establishes the pen servo motor and pen drop solenoid circuit. The opening and closing of contact 88 has had no effect at this point in the operation of the system. Thus, upon the filter change, the scan is momentarily stopped, the pen servo motor de-energized to disable the recording pen, the pen lifted from the chart, but the chart drive remains connected to the wavelength scan motor 58.

The next operation after restart of the scan by relay 67 is when blade 99 of control disc 60 again interrupts the radiation path between lamp 72 and photodiode 73 thereby causing the deenergization of relay 56. Upon such de-energization contacts 54 and 116 are again closed and contacts 86 and 91 are opened. Filter No. 2 conditioning contact 78 will also open when notch 76 is driven past this contact. It should be apparent that upon these latter operations nothing transpires in the circuitry; therefore, the relative timing of the opening and closing of these contacts is not critical.

Assume now that the scan continues until it is desired to change orders of the grating. As the end of the one order approaches and it is desired to change the position of the grating, notch 76 in condition control disc 59 has moved to armature 100 thus closing contact 94 and opening contact 102. Closure of contact 94 enables operation of relay 92 and opening of contact 102 conditions the chart clutch solenoid circuitry for operation upon the next operation of relay 56. When edge 103 of blade 99 (control disc 60) passes the light path between lamp 72 and photodiode 73, relay 56 is again energized opening contacts 54 and 116 and closing contacts 86 and 91.

The opening of contact 54 is now effective to de-energize the chart clutch solenoid disconnecting the chart from the scan drive motor 58 since contact 102 in the parallel circuit is now open. Closure of contact 86 is ineffective since contacts 70, 78 and 104 connected thereto are all open. Closure of contact 91, however, effects operation of relay 92 because enabling contact 94 is now closed. Energization of relay 92 opens contact 105, which is in line 84 in the pen servo circuit to open this circuit and disable the pen servo motor and pen drop solenoid allowing the pen to lift from the chart. The indentation 76 on condition control disc 59 is long enough to cover the entire order break angle on the wavelength cam with several degrees extra at each end of the order break. The opening between blades 99 and 108 on control disc 60 is bracketed by the opening 76 on disc 59. Thus, when the edge 109 interrupts the radiation to photodiode 73, the order break has been completed.

Edge 109 of projection 108 coincides with the exact wave-length in the previous grating order where the order break began. When radiation to photodiode 73 is interrupted by edge 109 relay 56 is de-energized thereby closing contact 54 to energize the chart clutch solenoid 51 and connect the chart to the scan motor 58, contact 91 is opened thereby de-energizing relay 92 which re-establishes the pen servo circuit and pen drop solenoid by closing contact 105. Contact 86 is also opened but does not affect the operation of the system because of the open contacts 70, 78 and 104 associated therewith. Open contact 93 in series with contact 116 renders the opening and closing of this contact ineffective. Thus by the foregoing operation since control edge 109 of disc 60 corresponds to the exact wavelength at which the scan was interrupted by control edge 103, an uninterrupted chart recording results. It should be noted that in the foregoing sequence the scan motor 58 continues to run to reposition the grating to the appropriate wavelength in the next order. However, since the chart is disconnected from the scan motor, an uninterrupted recording still results. Shortly after edge 109 passes photodiode 73 the indentation 76 in function control disc 59 passes armature 100 and contact 102 again closes and contact 94 reopens. The scan continues until indentation 76 reaches contact 104 thereby closing this contact. This conditions the filter motor control circuit for the insertion of filter No. 3 via contact 86 of relay 56 and contact 110 on control disc 95.

When control surface 111 of blade 108 on control disc 60 reaches the diode slit, radiation from lamp 72 falls on photodiode 73 and relay 56 is again energized closing contacts 86 and 91 and opening contacts 54 and 116. The operation of the system is similar to that which took place upon the insertion of filter No. 2 into the radiation beam path of the spectrophotometer. The opening of contact 54 is not effective to disengage the chart from the scan motor since this circuit is maintained through closed contact 102. Relay 92 is not affected by either contacts 91 or 116 since this circuit is inhibited by contacts 94 and 93 both of which are now open. Closure of contact 86 completes the circuit to the filter motor 79 via closed contacts 104 and 110 and the motor rotates to position filter No. 3 in the beam path, stoppage of motor 79 being effected by the opening of contact 110 when the indentation 96 on disc 95 reaches that contact. Contact 87 closes upon commencement of this filter change. Simultaneously with the energization of filter motor 79 relay 67 is operated which opens contacts 66 and 89 to stop the scan motor, disable the pen servo motor and lift the pen. Capacitor 97 maintains relay 67 energized for a short period of time after the circuitry is interrupted to allow transients to subside as hereinbefore described and, upon de-energization recloses contacts 66, 88 and 89 to restart the scan motor and reactivate the pen servo circuit. Contact 104 is subsequently opened to disable the filter motor circuit as illustrated in FIG. 3.

Near the completion of the scan cycle indentation 72 on condition control cam 59' operates to close contact 93. This contact conditions contact 116 for stopping the recording of the spectrum while allowing the scan motor 58 to continue to run until the instrument is conditioned to commence a new scan cycle. When the end of the scan is reached control edge 114 of blade 112 on control disc 60 passes the photodiode slit; relay 56 is de-energized closing contacts 54 and 116 and opening contacts 91 and 86. Upon closure of contact 116, relay 92 is energized through enabling contact 93 which is now closed. This opens contact 105 to disable the pen servo motor and pen drop solenoid to lift the pen from the chart paper and disable the pen servo circuit. Since contact 102 in parallel with contact 54 is closed, closing of contact 54 does not affect the clutch solenoid and the chart remains in registry with the wavelength cam through the legend area of the chart. Opening of contact 86 of relay 56 is also ineffective to energize filter motor 79 or relay 67 since conditioning switches 70, 78 and 104 are all open. The indentation on cam 59' is sufficiently long to overlap the operation of the indentation 76 and switch 70, that is, is sufficiently long to maintain contact 93 closed for a period of time long enough to allow the scan motor to drive the wavelength cam back to its original position while maintaining the pen servo circuit open and the pen drop solenoid inactivated.

A few degrees before the grating is in the correct position to restart a new scan, the leading edge if indentation 76 passes contacts 69 and 70, opening contact 69 and closing contact 70 to condition the filter motor and the relay holding circuit for the next operation of relay 56. At approximately 1° ahead of the initial scanning wavelength position, edge 110 of blade 112 on control disc 60 passes the radiation path and relay 56 is again energized. Closure of contact 86 completes the filter motor and relay 67 circuits through closed contacts 70 and 115. Motor 79 drives filter No. 1 into the beam path and control disc 95 to open contact 115 to interrupt this circuit, contact 110 closing when motor 79 starts to rotate.

Energization of relay 67 opens contacts 66, 88 and 89. Opening of contact 66 interrupts the circuit to scan motor 58 which stops. Contact 88 opens the holding circuit to relay 64 which drops out since contact 69 is now open, thereby opening contact 65. The scan cannot now be restarted, even when contacts 66 and 88 reclose, until manual start button 63 is closed. Opening of contact 89 maintains the pen servo motor and pen drop solenoid circuit interrupted when contact 116 opens de-energizing relay 92 and closing contact 105. At the end of the hold-over time of relay 67 when contacts 66, 88 and 89 again close, the cycle is not restarted since contact 65 is now open. Since this contact is also in the pen servo motor and pen drop solenoid circuit, the pen motor remains disabled and the pen drop solenoid unenergized.

This entire system is now in the same condition as at the time the manual start button was first depressed and a new scan may be started immediately upon closure of contact 63.

If at any time the operator desires to stop the scan during the cycle the manual stop button is depressed to interrupt the holding circuit for relay 64. If the instrument is in any part of the cycle which involves the scan motor, the operation of the instrument will immediately stop. If, however, the scan motor is already stopped, such, for example, as when a filter is being changed, the system will complete the filter change operation but the scan will not be restarted when relay 67 drops out. The scan may be restarted at the same wavelength by merely repressing the manual start button or the wavelength changed manually to restart at any other desired point in the spectrum.

It should be understood that although FIG. 3 represents generally a timing diagram for the various relays, contacts, and motors it is not necessarily to scale and is utilized only to indicate the condition of the various switches at various points in the cycle. For example, it may take several minutes after initiation of the scan to reach the point in the cycle where it is desired to insert filter No. 2 which may take only a few seconds. While an order break has been illustrated, a grating change may be accomplished in substantially the same manner except that an additional motor may be utilized to change the gratings. Further, any combination of grating change and order break within a grating may be accomplished in a similar manner.

It should be obvious that once the chart paper is properly aligned with the pen for a given wavelength in the cycle the chart paper will stay in registry with the wavelength drive even through the chart legend area of the paper. Further, while the pen drop solenoid and pen motor are illustrated as being energized by the same circuitry, by the addition of various other conditioning and relay contacts, only the pen motor may be disabled and the pen remain in contact with the chart paper during filter changes. If desired the pen may be lifted from the chart during order breaks or grating changes and at the end of the scan cycle. It should also be understood that although the function control cam has been illustrated as having blades and open sections any other arrangement which provides a pattern of opaque and transparent areas would be suitable.

There has been illustrated and described a single preferred embodiment of this invention which provides a completely automatic radiant energy analyzer in which all critical functions are controlled by a single photodiode and precision cam and the various circuits are conditioned for appropriate operation through various enabling and inhibiting circuits. By this means only the tolerances of the function control cam and its alignment with respect to the dispersing element is critical. The tolerances of the condition control cam and the alignment and positioning of the various mechanical switches associated therewith is not critical since no critical function of the system is initiated thereby.

While there has been illustrated and described a single preferred embodiment of this invention it should be understood that various modifications and variations may be made therein without departing from the scope of the invention as defined by the appended claims.

What is claimed is:

1. In a radiant energy analyzer of the type having radiation dispersing means for dispersing radiant energy, wavelength drive means including a wavelength drive circuit for scanning dispersed radiation past an exit slit, a plurality of order sorting filters, filter drive means including a filter drive circuit for positioning selective ones of said filters in the radiation path, a recorder including a chart drive means coupled to said wavelength drive, a control circuit comprising:

a radiation source;

a radiant energy detector positioned to receive radiant energy from said radiation source;

function control means having a pattern of opaque and transparent areas thereon, said function control means being positioned between said radiation source and said radiant energy detector for controlling radiant energy passing from said source to said detector;

switch means connected to said radiant energy detector and actuated in accordance with the pattern on said function control means;

conditioned control means coupled to said wavelength drive means and driven in synchronism with said dispersing means;

means operated by said condition control means for enabling said filter drive circuit while inhibiting said wavelength drive circuit upon selective actuations of said switch means;

means operated by said condition control means for inhibiting said filter drive circuit and said chart drive means while enabling said wavelength drive circuit upon selective actuation of said switch means; and means operated by said condition control means for inhibiting said filter drive circuit while enabling said wavelength drive circuit and said chart drive means upon selective actuation of said switch means.

2. In a radiant energy analyzer of the type having radiation dispersing means for dispersing radiant energy, wavelength drive means including a wavelength drive circuit for scanning dispersed radiation past an exit slit, a plurality of order sorting filters, filter drive means including a filter drive circuit for positioning selective ones of said filters in the radiation path, a recorder including a chart drive means coupled to said wavelength drive, a pen for making a record on a chart, a pen drive circuit coupled to a radiant energy detector positioned to receive dispersed radiation for controlling the position of said pen in response to the output of said detector, a control circuit comprising:

a radiation source;

a second radiant energy detector positioned to receive radiant energy from said radiation source;

function control means having a pattern of opaque and transparent areas thereon, said function control means being positioned between said radiation source and said second radiant energy detector for controlling radiant energy passing from said source to said second detector;

switch means connected to said second radiant energy detector and actuated in accordance with the pattern on said function control pattern means;

condition control means coupled to said wavelength drive means and driven in synchronism with said dispersing means;

means operated by said condition control means for enabling said filter drive circuit while inhibiting said wavelength drive circuit and said pen drive circuit upon selective actuations of said switch means whereby the scan is interrupted and the pen disabled during selection of said order sorting filters;

means operated by said condition control means for inhibiting said filter drive circuit, said chart drive means and said pen drive circuit while enabling said wavelength drive circuit upon selective actuation of said switch means whereby the position of said dispersing means may be changed while providing an uninterrupted record of the output of said radiant energy detector as a function of wavelength; and means operated by said condition control means for inhibiting said filter drive circuit and said pen drive circuit while enabling said wavelength drive circuit and said chart drive means upon selective actuation of said switch means whereby the chart remains in registry with said dispersing means over the legend area of the chart while said dispersing means is repositioned to commence a new scan.

3. The radiant energy analyzer in accordance with claim 2 further including means for lifting said pen from said chart when said pen drive circuit is disabled.

4. The radiant energy analyzer according to claim 2 wherein:

said filter drive circuit includes a filter drive motor;

means driven by said filter drive motor for opening said filter drive circuit when the selected one of said filters is in said beam path; and time delay means in said filter drive circuit for reestablishing said wavelength drive circuit and said pen drive circuit within a predetermined time after said filter drive circuit is opened.

5. The radiant energy analyzer according to claim 3 further comprising:

a relay having a contact in said wavelength drive circuit;

a holding circuit for said relay through said contact;

manual contact means for actuating said relay; and means coupled to said holding circuit and operated by said condition control means for maintaining said holding circuit independent of the operation of said switch means and conditioning the opening of said holding circuit upon the selective actuation of said switch means whereby the cycle is interrupted.

References Cited

UNITED STATES PATENTS

| 3,257,562 | 6/1966 | Erdman et al. | 356—95 |
| 3,304,831 | 2/1967 | Ashley | 356—96 |
| 3,431,054 | 3/1969 | Doonan et al. | 356—100 |

RONALD L. WIBERT, Primary Examiner

F. L. EVANS, Assistant Examiner

U.S. Cl. X.R.

356—97, 100